Patented May 3, 1949

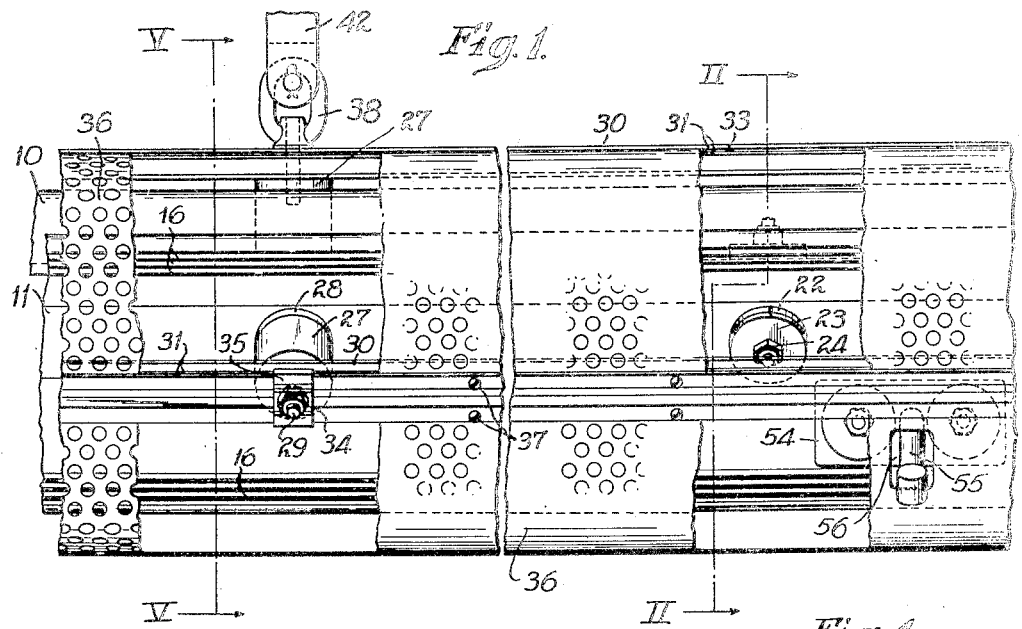
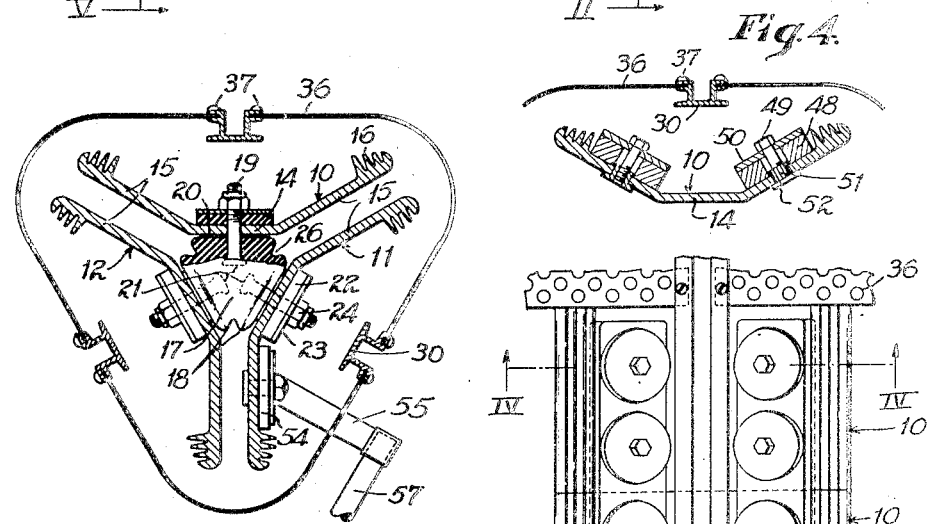
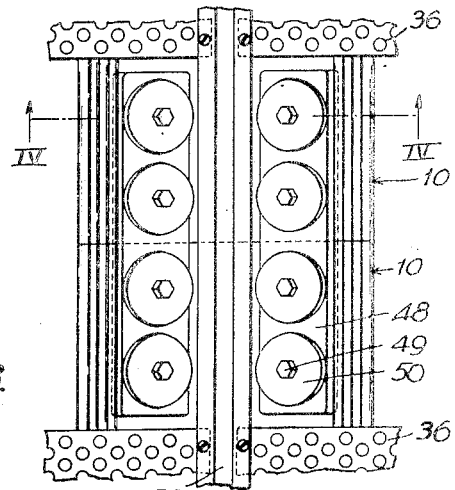
INVENTORS
BRUCE E. McARTHUR,
DONALD I. BOHN & ROBERT N. WAGNER.
BY
Howard B. Funk
ATTORNEY

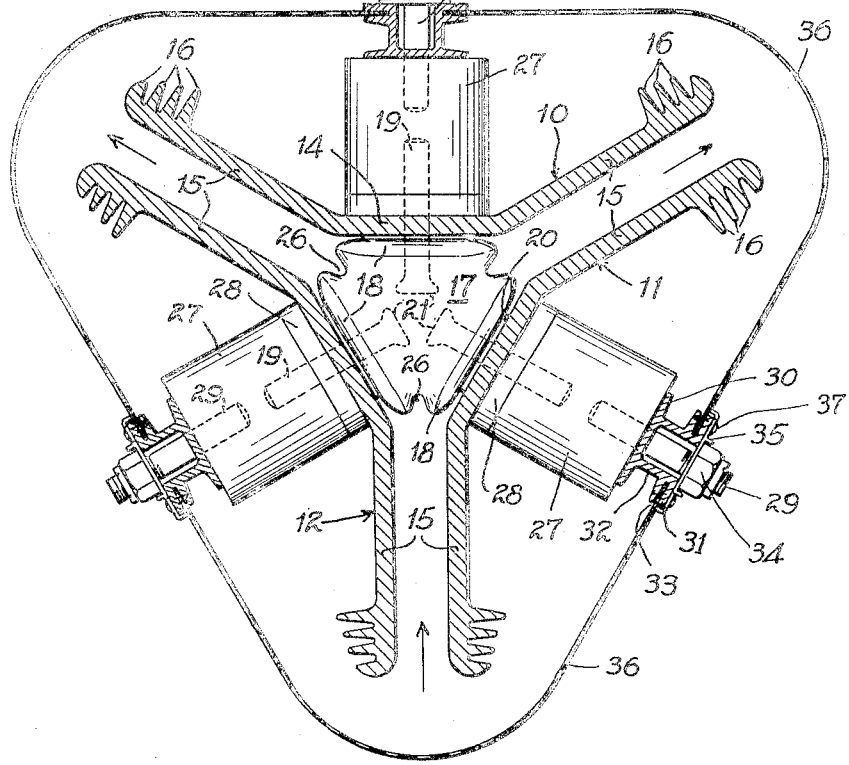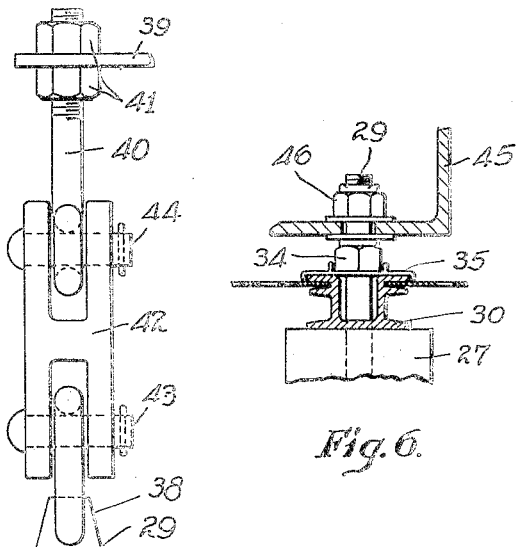

2,469,073

UNITED STATES PATENT OFFICE 2,469,073

ELECTRICAL BUS

Bruce E. McArthur, Medina, Ohio, and Donald I. Bohn and Robert N. Wagner, Pittsburgh, Pa., assignors to Aluminum Company of America, Pittsburgh, Pa., a corporation of Pennsylvania Application March 23, 1948, Serial No. 16,434

10 Claims. (Cl. 174—99)

This invention relates to a bus structure for the distribution of electrical power, particularly three-phase A. C. power.

An object of the invention is to provide an electrical power bus of the bare conductor type adapted to distribute large blocks of three-phase A. C. power with minimum voltage drop.

Another object of the invention is to provide a self-contained and self-supporting bus structure of simple and durable construction, effectively resistant to electrical forces encountered in operation, possessed of space saving compactness, is easy to assemble, erect and tap, and which is safe and economical.

A further object resides in the provision of a tri-conductor bus having the conductors in Y-formation and joined by central assembly insulators in cooperation with outer resilient pressure clamps to provide flexible shock absorbing qualities enabling the bus to withstand destructive surge current or short circuit conditions, to provide for effective air circulation and to facilitate application of an enclosing shield thereto, including bar members capable of use as a grounded neutral.

A more complete understanding of the invention will be had from the detailed description which follows taken in conjunction with the accompanying drawings illustrating a preferred embodiment, wherein:

Fig. 1 is a longitudinal side elevation of the elongated bus with portions of the enclosing shield broken away to show the bus structure more clearly;

Fig. 2 is a cross-sectional view taken on the line II—II of Fig. 1;

Fig. 3 is a fractional plan view of the bus showing the adjacent end portions of two longitudinally aligned bus bars connected together by rigid connectors;

Fig. 4 is a view taken on the line IV—IV of Fig. 3;

Fig. 5 is a cross-sectional view, on an enlarged scale, taken on line V—V of Fig. 1, and illustrating a typical suspension support for the bus structure, and Fig. 6 is detail view showing another form of attachment for the bus structure.

Referring to the drawing, the three-phase bus structure shown comprises three bare, elongated conductor bars 10, 11 and 12, each of wide angle trough form in cross-section, and in shape and dimensions duplicates of each other. The width to thickness ratio of the bars is preferably of between about 30 to 36 to 1. Each bar has a substantially flat central web or mid-portion 14 and integral side portions or flanges 15 in angular relation of about 30° with respect to web 14. Upstanding from the flanges 15 adjacent their outer edges and on the concave side of the trough, are groups of integral current carrying and heat dissipating fins 16, the fins being continuous from end to end of the conductor bars. For large capacity buses, the width of each flange 15 is preferably greater than that of the web 14, so that with the conductor bars assembled, the major portion of each bar will be opposed in spaced parallel relation to adjacent bars. The form of the bars adapts them for assembly about a common center in Y-relationship with the flanges 15 opposite and parallel with those of the adjacent bars, as clearly shown in Figs. 2 and 5. It also provides an open central area of generally triangular configuration, defined by the webs 14, throughout the length of the bars. Using close spacing which the form of the bars permits results in lowering the reactance.

Bar spacing and holding insulators 17 are disposed in the triangular central area between the bars and such insulators are preferably spaced at regular intervals along the bars. As indicated, insulators 17 are employed not only to maintain the bars in a fixed electrically spaced relation, but to hold them mechanically in assembled relation so as to provide a simple, self-supporting current carrying structure. Each of the insulators 17 in a transverse plane is made of three-sided or triangular shape and necked in at the apices of the triangle to provide three equi-angularly spaced circular knobs 18 the outer faces of which constitute bearing faces confronting the webs 14 of the conductor bars against which said bars are clamped. The inner end portions of three attaching elements in the form of bolts 19 angularly spaced 120° apart are embedded in the body of each insulator 17 and extend radially outwardly from the centers of the bearing faces of knobs 18.

To take up any surface irregularities and to uniformly distribute clamping pressure, thin metal washers 20 carried by bolts 19 are interposed between the webs 14 of the conductor bars and the bearing faces of the insulators 17.

The bolts 19 are formed at their inner ends with oval heads 21 rounded at all points, i. e. their peripheries are smoothly curved and their undersides are gradually blended into the bolt diameter, as shown, so as to prevent stress concentrations in the insulators. The embedded heads 21 are radially spaced so as not to short-circuit the bus assembly. The insulators 17 may be either the porcelain or molded phenolic resin type, the latter with its fabric filler being preferred for its economy of manufacture and its high strength characteristics. The provision of the described bolt head which uniformly distributes the stress in the phenolic resin insulator has been found to enable the insulator to withstand without damage the force which caused rupture of a ½ inch bolt of aluminum alloy at the expected value of 8500 pounds (68,000 p. s. i.), the mean diameter of the insulator around the bolt axis being approximately 3 inches. With adequate strength thus provided in the insulators 17, their location on four foot, two foot or one foot intervals, depending on the short circuit duty on the bus system will provide for short circuits of about 30,000, 40,000 and 60,000 amperes R. M. S., respectively.

At each of the points at which an insulator 17 is located, the webs 14 are provided with bolt holes through which the bolts 19 extend. Shock absorbing members 22, preferably thick washers, neoprene or the like having a stiffness of about 65 durometer being suitable, are positioned on the outer ends of the bolts 19 along with flat steel washers 23. Fastening members in the form of nuts 24 are threaded onto the bolts and drawn up tight to complete the mechanical assembly of the parts. Nuts 24 are of the self locking type, known as elastic-stop nuts, and maintain the assembly against development of looseness under the prevailing vibratory conditions of service, but any suitable nut locking means may be employed. In lieu of the washers 22, suitable springs may be used, and the usual wedge or cotter pin types of fasteners may be substituted for the locking nuts 24, if desired.

The provision of the resilient members 22 in the assembly constitutes an important feature of the invention since they function to relieve the peak short circuit stresses considerably by allowing the conductor bars to move or rock slightly relatively to each other. Without this provision all the short circuit stress would appear as a stress in the conductors and insulators. However, in this flexible arrangement any short circuit force will appear partly as energy in overcoming inertia of a conductor and partly in doing work on the resilient support thereof. Consequently, a damping effect is produced which reduces the peak force on the central insulators 17, thereby materially reducing the danger of damage to the structure due to heavy current surges.

The structure thus far described constitutes a unitary, simple and self-contained bus section adapted for erection and for end-to-end connection with similar bus sections. It is devoid of conventional separate frame assembled to hold it together. Since the bars 10, 11 and 12 are spaced from each other and are provided with heat dissipating fins, and the insulators 17 are at intervals, effective free circulation of cooling air about the conductors on all sides thereof is provided which results in adequate cooling and lower temperature rise in the bus structure. As to the spacing between the conductors, relatively wide spacing increases the reactance, so that the spacing should be as close as possible. Generally for normal current loads of between 2000 and 5000 amperes at voltages up to 600, approximately one inch spacing between the conductors (face-to-face distance between opposite flanges 15) is satisfactory from the standpoint of low reactance, effective insulation and cooling and reasonably low short circuit stresses. Spacing less than this decreases the insulation and increases the short circuit stresses immensely with but a disproportionate decrease in reactance. Comparative tests indicate that with the major portion of the bars opposed as above described, only a slightly lower reactance would be realized if the web portions 14 thereof were eliminated and the one inch spacing maintained throughout.

It also is important to provide a satisfactory long creepage distance along the surfaces of the central insulators at points opposite the gap or space between conductor flanges 15 to minimize leakage current between the phases carried by the respective conductors. Hence, as will be seen best in Fig. 5, the knob projections 18 of the insulators are formed with flat outer faces marginally curving into well rounded peripheries and the sides thereof are flared or necked in to meet the body of the insulator, thus providing a V-depression or gap 26 at the necked-in points between adjacent knobs. The undulating surfaces thereby affords a creepage distance across the apices of the insulators more than double the spacing between the conductor flanges 15, the washers 20 serving to sharply define the creepage distance. The shape of the insulator surfaces also prevents excessive dust collection thereon.

For the purpose of the bus carrying its own shielding enclosure there is provided, at say ten foot intervals along the bus, outside spool insulators 27 which preferably are affixed by threading on the bolts 19, in place of nuts 24, as shown in Figs. 1 and 5; resilient washers 28, corresponding to washers 22 of Fig. 2, being first interposed. It is here pointed out that these insulators 27 are not intended nor required to withstand any of the short circuit stresses. Hence, they may be bolted to webs 14 instead of securing them on bolts 19, if desired. An outwardly extending stud bolt 29 is threaded into the outer end of each spool insulator 27. Elongated supporting members 30, preferably aluminum extrusions of channel shape and formed with a pair of continuous spaced fins 31 outstanding from each of the flanges 32 thereof and defining a shield receiving groove 33 therealong, are seated on the insulators 27 and are coextensive in length with the conductor bars thereby to aid in stiffening the structure. To provide for expansion between the bus bars and the shield supporting bars 30, the latter are provided with elongated holes at points where the stud bolts 29 extend through them. Lock nuts 34, similar to nuts 24, are applied to stud bolts 29 to hold the supporting bars 30 against the housing insulators 27. Lock washers 35 having upturned ears engaging the sides of nuts 33 have their ends bent down over the edges of fins 31 after the nuts 34 have been tightened, these washers serving to prevent the stud bolts from turning in the insulators 27. Sheets 36 of solid but preferably reticulated or perforated metal preformed into U-shape and individually of suitable length are placed end-to-end in position between adjacent pairs of supporting bars 30 with their edges seated in the grooves 33 thereof and fastened by suitable means such as self threading sheet metal screws 37 at desired intervals. Thereby the buses are fully encased.

A further advantage of this shielding arrangement is that the supporting members 30, being fully electrically insulated from the conductor bars, are readily usable as a grounded neutral in the current distribution system, if desired. When so used, they, of course, will be electrically connected end-to-end and to each other by suitable connectors, not shown, but well known in the art, and grounded at desired points. Thereby, the use of a fourth conductor which would otherwise have to be provided is dispensed with.

The provision of the group of fins 16 along the outer edges of the bus bars 10, 11 and 12 not only aids in cooling, but increases the stiffness of the bars for resisting physical stress and distributes the cross-sectional area of the metal for efficient carrying of the current. The fins should be quite deep in relation to their thickness, a 3 to 1 ratio, or better, being desired, as shown. They may be formed in any suitable way, as by rolling or extrusion. The difficulties of forming the trough-shaped and finned bars are surmounted by extruding them preferably of light-weight aluminum conductor metal, whereby in addition to advantage of facile and economical production, that of long length is obtained so as to materially reduce the number of splices that would otherwise be required in making long bus runs. As an example, enclosed bus sections, as complete self-contained and self-supporting units, have been made in forty foot lengths and found to be practical and easy to erect in such unit lengths because of the overall compactness, light weight and stiffness of the units.

Geometrically, the bus unit presents a triangular exterior of continuous, unobstructed symmetry end-to-end reducing its space requirements, thereby facilitating its erection in overhead runs in confined and clustered quarters, such as presented by roof trusses or other steelwork. For horizontal suspension, each bus section or unit carries two or more, eye-screw sockets 38 (Figs. 1 and 5) threaded on the outer ends of spaced and in line stud bolts 29, the second eye-socket 38 not being shown. Although various hanger means connecting with eye-socket 38 and a part 39 of overhead steelwork (Fig. 5) may be used to support the bus section, the arrangement shown in Fig. 5 is satisfactory when allowance for expansion movement of the bus is desired. It consists of hanger eye-bolt 40 clamped to part 39 by nuts 41 and a double clevis 42 carrying pins 43 and 44 which extend through the respective eyes of screw socket 38 and hanger bolt 40. Suitably, the spacing between the suspension points for the bus section may be about 20 feet, but greater or lesser spacing may be used as found desirable.

As erected horizontally, the bus section will be oriented on its axis automatically with one bus bar uppermost and with the other two therebelow with their lowermost flanges 15 in a vertical position. Thereby, chimney effect is established along the clearance space between the conductors which serves to increase air flow therethrough, as indicated by the arrows in Fig. 5. Because of the short axial length of the insulators 17, they offer but minimum restriction to the air flow in the air pasageway between the conductor bars.

In Fig. 6, an alternate attachment of the bus sections to a fixed member 45 simply consists of providing at the attaching points stud bolts 29 of a length sufficient to receive lock nut 34 thereon and also to pass through the member 45 and receive another lock nut 46 thereon. The lock nut 46 may be drawn up tightly or loosely depending on whether a fixed or sliding support is desired, the hole through which the bolt passes being of enlarged diameter, as shown, to permit limited movement of the bolt. This type attachment is suitable for either horizontal or vertical placement of the bus.

After erection, the conductor bars are spliced by either flexible or rigid splice bars, the latter form being shown in Figs. 3 and 4. A pair of splice bars 48 overlap the ends of adjacent conductors 10 and are disposed on the flanges 15 thereof. Four fine thread high strength bolts 49 and four spring washers 50 having a compressive capacity of about 10,000 pounds, are used for each splice bar, as shown, all disposed on the outer side of the conductor bar. Tapping of the conductor bar being impractical, clamping nuts are required, but standard thickness nuts would reduce the clearance distance between the phases or conductors. To overcome the difficulty, nuts formed with a splined periphery 51 and a thin head 52 of enlarged diameter are provided (Fig. 4). Undersize holes are first provided in the conductor bars into which the shanks of the nuts are pulled by the splice bolts 49 when the assembly is first made, the nuts thereafter remaining a tightly fitting part of the conductor bar. When bolts 49 are fully screwed into the nuts, they develop the full compressive capacity of the spring washers 50 and thereby effectively complete the splice both mechanically and electrically. The other conductor bars are similarly spliced together, the use of dual splice bars holding the conductor bars in alignment and increasing their twist resistance.

At any point where it is desired to tap the conductors for power takeoff, it is a simple matter merely to remove the individual shield plates 36 at the tap-off point to expose the conductors. Tap fittings, consisting of a flat base 54 and extension arm 55, are secured to the respective bus bars by means of bolt, nut and spring washer, the same as those described in connection with the splice bars, the attachments being made at both sides of the extension 55, as shown in Fig. 1. Due to the flat surfaces of the bus bars, taps can be made of adequate size and at any location found necessary, either during initial installation or later, as required. Apertures 56 are formed in the shield plates 36 for passage of the tap extensions 55 therethrough. Flexible cables 57 of desired capacity are attached to the tap fittings and run to the desired point of use. Only one cable tap to one phase bar of the bus is shown in Figs. 1 and 2, the taps for the other phase bars being similar.

From the foregoing, it will be seen that there is provided a power bus structure of substantially simplified, compact and rugged construction and of but few parts. Its low reactance renders it particularly suitable for distribution of A. C. power in the range of frequencies commonly generated by rotating equipment. The many other advantages of the structures will be apparent to those skilled in the art from the above description and, of course, changes and modifications other than those specifically shown and described may be made within the scope of the invention as set forth in the appended claims.

What is claimed is:

1. A three-phase bus bar structure comprising three parallel conductors of wide angle trough form, each having a substantially flat central portion and integral side portions in angular relation of about 30° with respect to the central portion, said conductors being assembled in Y-relationship, a plurality of centrally disposed insulators located at intervals along the length of said conductors and separating them in predetermined spaced apart relation, radially extending attaching elements carried by said insulators and extending through the central portion of said conductors, respectively, to the outer sides thereof, and clamping members on the outer ends of said attaching elements for clamping said conductors against said central insulators.

2. A three-phase bus bar structure comprising three parallel conductors of wide angle trough form, each having a substantially flat central portion and integral side portions in angular relation of about 30° with respect to the central portion, said conductors being assembled in Y-relationship, a plurality of centrally disposed insulators located at intervals along the length of said conductors and separating them in predetermined spaced apart relation, radially extending attaching elements carried by said insulators and extending through the central portion of said conductors, respectively, to the outer sides thereof, clamping members on the outer ends of said attaching elements for clamping said conductors against said central insulators, and resilient means interposed between said clamping members and said conductors to hold the latter yieldingly against said central insulators.

3. A three-phase bus bar structure comprising three parallel conductors of wide angle trough form, each having a substantially flat central portion and integral side portions in angular relation of about 30° with respect to the central portion, said conductors being assembled in Y-relationship, a plurality of centrally disposed insulators located at intervals along the length of said conductors and separating them in predetermined spaced apart relation, radially extending attaching elements carried by said insulators and extending through the central portion of said conductors, respectively, to the outer sides thereof, clamping members on the outer ends of said attaching elements for clamping said conductors against said central insulators, elongated supporting members parallel and coextensive in length with said conductors, spaced outwardly from the said central portions thereof, means including longitudinally spaced spool insulators for holding said members in said spaced parallel relation, means comprising reticulated sheets secured to said supporting members and enclosing said conductors, and attachment means for the structure connected at spaced points to the outer side of one of said supporting members.

4. A three-phase bus bar structure comprising three parallel conductors of wide angle trough form, each having a substantially flat central portion and integral side portions in angular relation of about 30° with respect to the central portion, said conductors in assembled relation being disposed in Y-relationship, a plurality of centrally disposed insulators located at intervals along the length of said conductors and separating them in predetermined spaced apart relation, radially extending attaching elements carried by said conductors, respectively, to the outer sides thereof, and clamping means on the outer ends of said attaching elements for clamping said conductors against said central insulators, the width of each said side portion of said conductors being greater than that of said central portion thereof, whereby the major portion of each conductor is opposed in spaced parallel relation to adjacent conductors.

5. A three-phase bus bar structure comprising three parallel conductors of wide angle trough form, each having a substantially flat central portion and integral side portions in angular relation of about 30° with respect to the central portion, said conductors being assembled in Y-relationship, a plurality of centrally disposed insulators located at intervals along the length of said conductors and separating them in predetermined spaced apart relation, radially extending attaching elements carried by said insulators and extending through the central portion of said conductors, respectively, to the outer sides thereof, and clamping means on the outer ends of said attaching elements for clamping said conductors against said central insulators, the width of each said side portion of said conductors being greater than that of said central portion thereof, whereby the major portion of each conductor is opposed in spaced parallel relation to adjacent conductors, each conductor having upstanding on the concave side thereof adjacent their outer edges, a plurality of integral continuous fins having a depth to thickness ratio of at least 3 to 1, for increasing the stiffness of the conductor and augmenting its current carrying and heat dissipating capacity.

6. The structure as defined in claim 1, wherein each of said insulators in a transverse plane is formed with three equi-angularly spaced projecting knobs having rounded peripheries and whose outer faces present substantially flat bearing faces confronting the central portions of said conductors, for clamping of the conductors thereagainst, and said insulators at points between said knobs in said plane being necked-in along converging lines to increase the surface distance along said insulators from one conductor to the next.

7. The structure as defined in claim 1 wherein said attaching elements comprise bolts formed with oval heads at one end with the headed ends imbedded in said insulators and out of contact with each other, said heads having smoothly curved peripheries and blending gradually at their under sides into the bolt diameter thereby to effect stress distribution from said bolts over a greater area within said insulators so as to prevent stress concentration in the insulators.

8. A three-phase bus bar structure comprising three parallel conductors of wide angle trough form, each having a substantially flat central portion and integral side portions in angular relation of about 30° with respect to the central portion, said conductors being assembled in Y-relationship, a plurality of centrally disposed insulators located at intervals along the length of said conductors and separating them in predetermined spaced apart relation, radially extending attaching bolts angularly spaced 120° apart carried by said insulators and extending through the central portion of said conductors, respectively, to the outer sides thereof, clamp means comprising lock nuts and resilient members engaged on the outer portion of said bolts for resiliently clamping said conductors against said central insulators, spool insulators threaded on certain of said bolts in lieu of said lock nuts, at spaced intervals along each of said conductors, elongated supporting members carried by said spool insulators in outwardly spaced relation to said conductors, and enclosure means comprising sheets secured to said supporting members and forming an enclosing shield for said conductors throughout the length thereof.

9. A three-phase bus bar structure comprising three parallel conductors of wide angle trough form, each having a substantially flat central portion and integral side portions in angular relation of about 30° with respect to the central portion, said conductors being assembled in Y-relationship, a plurality of centrally disposed insulators located at intervals along the length of said conductors and separating them in predetermined spaced apart relation, radially extending attaching bolts angularly spaced 120° apart carried by said insulators and extending through the central portion of said conductors, respectively, to the outer sides thereof, clamp means comprising lock nuts and resilient members engaged on the outer portion of said bolts for resiliently clamping said conductors against said central insulators, spool insulators threaded on certain of said bolts in lieu of said lock nuts, elongated channel members seated on the outer ends of said spool insulators and spanning them, said channel members and said conductors being coextensive in length, means for attaching said channel members to said spool insulators, spaced fins outstanding from the opposite sides of said channel members and defining a shield receiving groove along said sides, a plurality of reticulated metal sheets of U-shape disposed end to end in position between adjacent pairs of members and having their edges seated in said grooves thereof, and means for fastening said sheets at intervals along their edges, said members and said sheets forming an enclosing shield for said conductors.

10. A three-phase bus unit comprising three parallel conductors, each having a substantially flat central web portion and integral flanges along the edges thereof, said conductors being disposed in spaced relation about a common center in equi-angular relationship, a plurality of centrally disposed insulators formed with three projecting knobs angularly spaced 120° apart providing bearing faces confronting said web portions of said conductors, three radial attaching bolts embedded in each said insulator and extending outwardly from the centers of said knobs and through said web portions, respectively, and clamp means comprising resilient washers and lock nuts threaded on the outer ends of said bolts for resiliently clamping said conductors against said central insulators, said insulators being spaced at intervals along the length of said conductors and maintaining them in said spaced relation.

BRUCE E. McARTHUR.
DONALD I. BOHN.
ROBERT N. WAGNER.

No references cited.